(No Model.)
A. J. B. BERGER.
POWER WHEEL FOR ENDLESS CONVEYERS OR ELEVATORS.
No. 528,357. Patented Oct. 30, 1894.
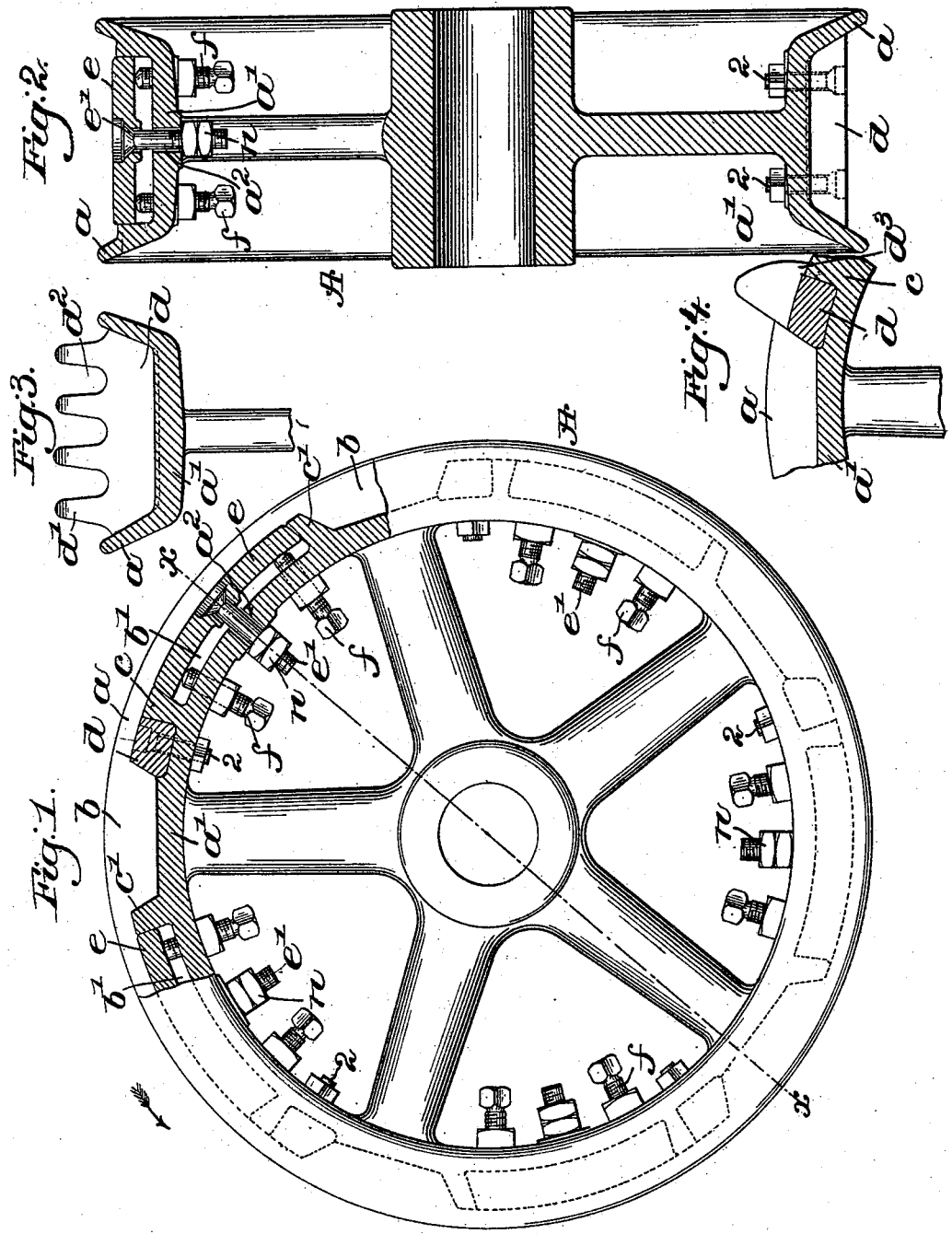
Witnesses.
Louis N. Gowell
Thomas J. Drummond
Inventor:
Ambrose J. B. Berger
by Crosby & Gregory
Attys.

UNITED STATES PATENT OFFICE.

AMBROSE J. B. BERGER, OF HINGHAM, MASSACHUSETTS, ASSIGNOR TO THE STEEL CABLE ENGINEERING COMPANY, OF MAINE.

POWER-WHEEL FOR ENDLESS CONVEYERS OR ELEVATORS.

SPECIFICATION forming part of Letters Patent No. 528,357, dated October 30, 1894.

Application filed December 4, 1893. Serial No. 492,654. (No model.)

*To all whom it may concern:*

Be it known that I, AMBROSE J. B. BERGER, of Hingham, county of Plymouth, State of Massachusetts, have invented an Improvement in Power-Wheels for Endless Conveyers or Elevators, of which the following description, in connection with the accompanying drawings, is a specification, like letters and figures on the drawings representing like parts.

In the operation of endless conveyers or elevators, particularly in that class where one or more endless cables are used, considerable inconvenience and delay is caused by the stretching of the cable, which throws the attachments out of proper adjustment with the recesses or pockets of the power wheel, whatever may be their size or shape. The distance between the attachments and the position of the recesses or pockets in the wheel are correctly proportioned when the apparatus is set up, and when they are thus thrown out of adjustment poor work or none at all is the result, to be remedied by substituting a wheel of greater diameter and properly proportioned, or by shortening the cable and readjusting the attachments thereon, a most laborious operation.

When the conveyer is subjected to heavy loads it frequently happens that a sudden start will lift the attachments out of the pockets of the power wheel, the latter revolving without moving the cable, severely straining and wearing the parts.

This invention has for its object the production of a power wheel which will be free from the foregoing objections, said wheel having an adjustable tread whereby slack of the cable may be taken up without the substitution of another wheel or the readjusting of the attachments.

In accordance therewith my invention consists, in a power wheel for endless conveyers, of an adjustable tread surface, the wheel rim having a series of peripheral pockets formed therein, and removable wearing blocks adapted to be secured in one of said pockets, substantially as will be described; also, in a power wheel for endless conveyers, side pockets, and the rim having a series of pockets formed in its periphery between said flanges, combined with tread wearing plates concentric to the rim and between the pockets, and adjustable connections between said plates and the wheel rim, whereby the tread surface may be moved toward and from the rim and thereby radially adjusted, substantially as will be described.

Other features of my invention will be hereinafter described and particularly pointed out in the claims.

Figure 1 in side elevation and partly in section represents a power wheel embodying my invention. Fig. 2 is a sectional view thereof, taken on the line $x$—$x$, Fig. 1, and Figs. 3 and 4 are enlarged detail views of the bearing block for use with heavily loaded conveyers, the wheel rim being shown in section.

The power wheel A, herein shown as provided with side flanges $a$, has its rim $a'$ between the flanges divided into a series of peripheral pockets or depressions $b$ and $b'$ by the transverse projections or abutments $c$ and $c'$. Each pocket $b$ is preferably recessed adjacent the abutment $c$ to receive a removable wearing block $d$, secured in place by suitable bolts 2 extended through the rim $a'$, the front face of said block being inclined upwardly and rearwardly, as shown, and adapted to bear against the conveyer attachment as the wheel is rotated in the direction of the arrow Fig. 1. These blocks receive the greater part of the wear and tear, and are preferably made of hardened steel or chilled cast iron. When worn out they can be readily replaced, without making the substitution of a new wheel necessary, inasmuch as the bottom and other end of the pocket get comparatively little wear.

The depressions $b'$, intermediate the pockets $b$, receive therein tread wearing plates $e$, guided by the abutments $c$, $c'$, the outer convexed surfaces of the plates forming the tread of the wheel, to sustain the portion of the cable between the attachments. A headed bolt $e'$ is extended through each wearing plate and loosely into an opening $a^2$ in the wheel rim, and held in place by set nuts $n$. See Figs. 1 and 2. Set screws $f$ pass through threaded openings in the rim, and bear upon the inner surface of the tread plate, as clearly shown in Fig. 1, to maintain it in adjusted position.

The headed bolts $e'$ and the set screws $f$ form adjustable connections between the plates and the rim whereby the tread surface may be moved toward and from the rim and thereby radially adjusted.

From the foregoing it will be evident that the tread wearing plates $e$ may be adjusted toward and from the center of the wheel, thereby decreasing or increasing the diameter of the tread surface, so that variations in length of the conveyer may be provided for without alteration of the attachments thereon or the substitution of a new wheel.

The pockets $b$ are of sufficient depth to permit of the adjustment of the tread surface, and the rearwardly inclined face of the bearing block engages the attachment properly whether the tread surface of the wheel is enlarged or diminished.

Should a tread plate break or become badly worn it can be readily replaced.

It sometimes happens that with a heavy load on the conveyer the power wheel is suddenly started, so that the attachments are made to move up the inclined faces of the wearing blocks and entirely out of the pockets, the wheel rotating against the conveyer cables without transmitting any power thereto, straining the apparatus and subjecting it to great unnecessary wear. To obviate this I extend the wearing block up some distance beyond the tread surface of the wheel, as at $d'$, see Figs. 3 and 4, forming recesses $d^2$ therein for the reception of the cables forming the endless conveyer. The faces of the blocks are thus of such a height that it is impossible for the strain exerted by the heaviest possible load to pull the attachments out of the pockets and over the wearing blocks. On the contrary, when the strain is great the attachments are moved outwardly along the inclined faces of the blocks at starting, but as soon as the inertia has been overcome they slide back into place.

As best shown in Fig. 4 I have made a shoulder in the back of the block, at $d^3$, so that the block rests upon the side and top also of the abutment $c$, thereby relieving the bolts 2 from a great deal of strain, and strengthening the wheel.

My invention is not restricted to the precise construction herein set forth, nor to the number or shape of the particular parts of the wheel, as the same may be varied without departing from the spirit of my invention.

I claim—

1. In a power wheel for endless conveyers, an adjustable tread surface, the wheel having a series of peripheral pockets formed therein, and removable wearing blocks adapted to be secured in one end of said pockets, substantially as described.

2. In a power wheel for endless conveyers, side flanges, and the rim having a series of pockets formed in its periphery between said flanges, combined with tread wearing plates concentric to the rim and between the pockets, and adjustable connections between said plates and the wheel rim, whereby the tread surface may be moved toward and from the rim and thereby radially adjusted, substantially as described.

3. In a power wheel for endless conveyers, the rim having a series of pockets formed in its periphery, and removable wearing blocks for and adapted to be secured in said pockets and extending radially beyond the tread surface of the wheel between the pockets, said extended portions engaging the conveyer attachments, substantially as described.

4. In a pocket wheel for cable conveyers, removable wearing blocks for and adapted to be secured in the pockets extended beyond the tread surface of the wheel, and radially recessed to receive the cable, substantially as described.

In testimony whereof I have signed my name to this specification in the presence of two subscribing witnesses.

AMBROSE J. B. BERGER.

Witnesses:
JOHN C. EDWARDS,
FREDERICK L. EMERY.